(12) United States Patent
Herner

(10) Patent No.: US 12,462,873 B2
(45) Date of Patent: Nov. 4, 2025

(54) THIN FILM STORAGE TRANSISTOR WITH SILICON OXIDE NITRIDE CHARGE TRAPPING LAYER

(71) Applicant: SUNRISE MEMORY CORPORATION, San Jose, CA (US)

(72) Inventor: Scott Brad Herner, Portland, OR (US)

(73) Assignee: SUNRISE MEMORY CORPORATION, San Jose, CA (US)

( * ) Notice: Subject to any disclaimer, the term of this patent is extended or adjusted under 35 U.S.C. 154(b) by 651 days.

(21) Appl. No.: 17/661,255

(22) Filed: Apr. 28, 2022

(65) Prior Publication Data

US 2022/0392529 A1    Dec. 8, 2022

Related U.S. Application Data

(60) Provisional application No. 63/196,587, filed on Jun. 3, 2021.

(51) Int. Cl.

| | |
|---|---|
| *G11C 16/04* | (2006.01) |
| *H10B 41/27* | (2023.01) |
| *H10B 43/27* | (2023.01) |
| *H10D 30/67* | (2025.01) |
| *H10D 30/69* | (2025.01) |

(52) U.S. Cl.
CPC ......... *G11C 16/0483* (2013.01); *H10B 41/27* (2023.02); *H10B 43/27* (2023.02); *H10D 30/6713* (2025.01); *H10D 30/6757* (2025.01); *H10D 30/693* (2025.01)

(58) Field of Classification Search
CPC ............ G11C 16/0483; G11C 16/0416; H01L 29/78618; H01L 29/78696; H01L 29/7926; H01L 29/78642; H10B 41/27; H10B 43/27
See application file for complete search history.

(56) References Cited

U.S. PATENT DOCUMENTS

| | | |
|---|---|---|
| 10,121,553 B2 | 11/2018 | Harari |
| 2007/0012988 A1* | 1/2007 | Bhattacharyya ..... H10D 64/035 257/314 |

(Continued)

OTHER PUBLICATIONS

Tae Hun Kim, Il Han Park, Jong Duk Lee, Hyung Cheol Shin, and Byung-Gook Park, "Electron trap density distribution of Si-rich silicon nitride extracted using the modified negative charge decay model of silicon-oxide-nitride-oxide-silicon structure at elevated temperatures," Appl. Phys. Lett. 89, 063508 (2006); https://doi.org/10.1063/1.2335619, 4 pages.

(Continued)

*Primary Examiner* — Yara B Green
*Assistant Examiner* — Akhee Sarker-Nag

(57) ABSTRACT

A thin-film storage transistor includes a charge storage film provided between a channel region and a gate conductor where the charge storage film includes a tunneling dielectric layer formed adjacent the channel region and a charge trapping layer formed adjacent the tunneling dielectric layer. In some embodiments, the charge trapping layer is a layer including silicon, silicon oxide and silicon nitride materials. In one embodiment, the charge trapping layer is a layer including a mixture of silicon, silicon oxide and silicon nitride materials, where the silicon oxide and silicon nitride may or may not be their respective stoichiometric compounds.

16 Claims, 2 Drawing Sheets

(56) References Cited

U.S. PATENT DOCUMENTS

| | | | |
|---|---|---|---|
| 2015/0194440 A1* | 7/2015 | Noh ................... | H10D 30/693 |
| | | | 257/324 |
| 2017/0092371 A1* | 3/2017 | Harari ................. | H10D 30/693 |
| 2017/0263623 A1* | 9/2017 | Zhang ............... | H01L 21/02636 |
| 2019/0027567 A1* | 1/2019 | Bhattacharyya ... | H10D 30/0413 |
| 2021/0123161 A1* | 4/2021 | Lee ................... | H01L 21/02293 |
| 2021/0335999 A1* | 10/2021 | Kai ....................... | H10B 41/27 |
| 2022/0157848 A1* | 5/2022 | Lue ....................... | H10B 43/27 |
| 2022/0320128 A1* | 10/2022 | Greenlee ................ | H10B 43/40 |
| 2023/0010657 A1* | 1/2023 | Wu ..................... | H10D 30/014 |

OTHER PUBLICATIONS

M. Rosmeulen, E. Sleeckx and K. De Meyer, "Silicon-rich-oxides as an alternative charge-trapping medium in Fowler-Nordheim and hot carrier type non-volatile-memory cells," Digest. International Electron Devices Meeting,, 2002, pp. 189-192, doi: 10.1109/IEDM. 2002.1175810, 4 pages.

* cited by examiner

THIN FILM STORAGE TRANSISTOR WITH SILICON OXIDE NITRIDE CHARGE TRAPPING LAYER

CROSS REFERENCE TO RELATED APPLICATIONS

The present application claims priority to U.S. provisional patent application, Ser. No. 63/196,587, entitled "Thin Film Storage Transistor with Silicon Oxide Nitride Charge Trapping Layer," filed on Jun. 3, 2021, which is incorporated herein by reference for all purposes.

FIELD OF THE INVENTION

The invention relates to thin-film storage transistors and, in particular, to thin-film storage transistors including a charge trapping layer formed using silicon oxide nitride.

BACKGROUND OF THE INVENTION

U.S. Pat. No. 10,121,553 (the '553 Patent), entitled "Capacitive-Coupled Non-Volatile Thin-film Transistor NOR Strings in Three-Dimensional Arrays," filed on Aug. 26, 2016, and issued on Nov. 6, 2018, discloses storage or memory transistors organized as 3-dimensional arrays of NOR memory strings formed above a planar surface of a semiconductor substrate. In the '553 Patent, a NOR memory string includes numerous thin-film storage transistors that share a common bit line and a common source line. The '553 Patent is hereby incorporated by reference in its entirety for all purposes. In one implementation, storage transistors in a NOR memory string are arranged along a direction (a "horizontal direction") that is substantially parallel to the planar surface of the semiconductor substrate. In such a 3-dimensional array, the NOR memory strings are provided on multiple planes (e.g., 8 or 16 planes) above the semiconductor substrate, with the NOR memory strings on each plane arranged in rows and one or more columns along two orthogonal horizontal directions. Data is stored in a charge storage film in each storage transistor. In some examples, the charge storage film includes a tunneling dielectric layer, a charge trapping layer and a blocking layer. For example, the charge storage film can be formed as a multilayer including silicon oxide, silicon nitride, and silicon oxide, arranged in this order. Such a charge storage film is also referred to as an ONO layer. An applied electrical field across the charge trapping layer adds or removes charge from charge traps in the charge trapping layer, altering the threshold voltage of the storage transistor to encode a given logical state to the storage transistor. Characteristics of the charge storage film affect the performance characteristics of the storage transistors.

SUMMARY OF THE INVENTION

According to one embodiment of the present invention, a thin-film storage transistor may include a source region, a drain region, a channel region, a gate conductor, and a charge storage film provided between the channel region and the gate conductor and electrically isolated therefrom. The charge storage film includes a tunneling dielectric layer formed adjacent the channel region; and a charge trapping layer formed adjacent the tunneling dielectric layer where the charge trapping layer is a layer including silicon, silicon oxide and silicon nitride materials. In some embodiments, the charge storage film further includes a blocking layer adjacent the charge trapping layer. In one embodiment, the charge trapping layer is a silicon-silicon oxide-silicon nitride layer.

These and other advantages, aspects and novel features of the present invention, as well as details of an illustrated embodiment thereof, will be more fully understood from the following description and drawings.

BRIEF DESCRIPTION OF THE DRAWINGS

Various embodiments of the invention are disclosed in the following detailed description and the accompanying drawings. Although the drawings depict various examples of the invention, the invention is not limited by the depicted examples. It is to be understood that, in the drawings, like reference numerals designate like structural elements. Also, it is understood that the depictions in the FIGS. are not necessarily to scale.

DETAILED DESCRIPTION OF THE INVENTION

According to embodiments of the present invention, a thin-film storage transistor includes a charge storage film provided between a channel region and a gate conductor where the charge storage film includes a tunneling dielectric layer formed adjacent the channel region and a charge trapping layer formed adjacent the tunneling dielectric layer. In some embodiments, the charge storage film further includes a blocking layer adjacent the charge trapping layer. In some embodiments, the charge trapping layer is a silicon-silicon oxide-silicon nitride layer including silicon, silicon oxide and silicon nitride materials. The silicon-silicon oxide-silicon nitride layer may also be referred to as a silicon-rich silicon oxide nitride layer. In some embodiments, the silicon-silicon oxide-silicon nitride charge trapping layer includes 5 or more atomic percent of oxygen.

The charge trapping layer in embodiments of the present invention can be used to construct thin-film storage transistors in a semiconductor memory device. In some embodiments, thin-film storage transistors incorporating the silicon-silicon oxide-silicon nitride charge trapping layer are used to construct a three-dimensional memory array, such as the three-dimensional NOR memory array described in the '553 patent. In some embodiments, the thin-film storage transistors are vertical-channel thin-film storage transistors.

Figure 1:
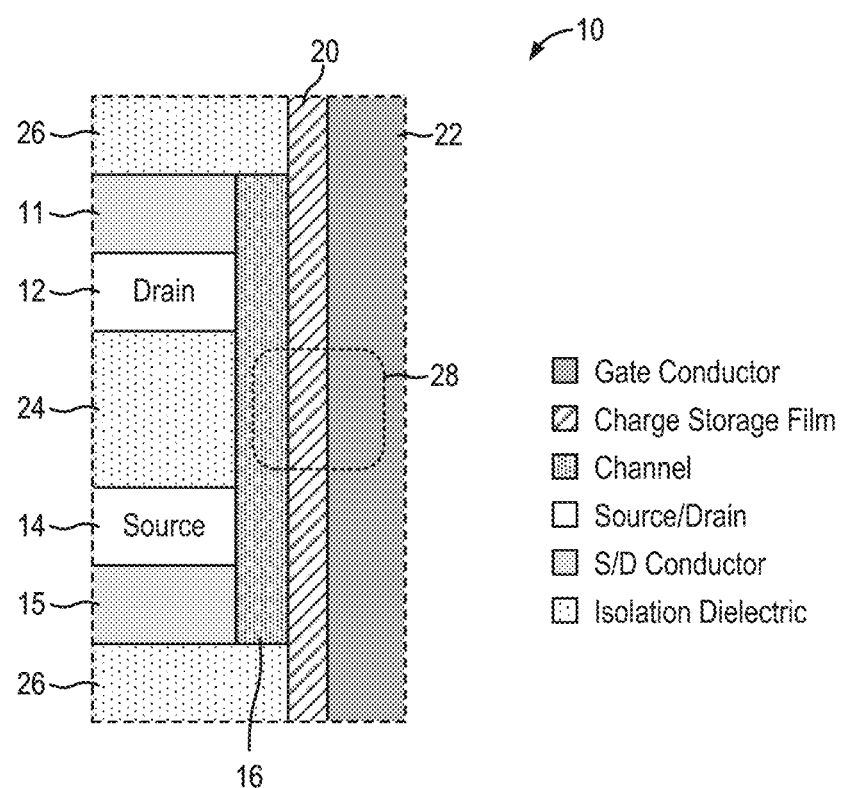
FIG. 1 is a cross-sectional view of a thin-film storage transistor in embodiments of the present invention.

FIG. 1 is a cross-sectional view of a thin-film storage transistor in embodiments of the present invention. In the present embodiment, the storage transistor is a vertical channel, polycrystalline thin-film storage transistor formed in a three-dimensional array of storage transistors. For instance, the three-dimensional array of storage transistors may be used to form a semiconductor memory device. In the present illustration, FIG. 1 illustrates one storage transistor being a portion of the three-dimensional array of storage transistors. In the present description, the thin-film storage transistor is also referred to as a "memory cell."

Referring to FIG. 1, a storage transistor ("memory cell") 10 includes a drain region 12, a source region 14, a channel region 16, a charge storage film 20 and a gate conductor 22. The gate conductor 22 forms the word line of the storage transistor array. In the present embodiment, the drain region 12 and the source region 14 are provided with respective conductive layers 11 and 15 to reduce the resistance of the source/drain regions when the storage transistor is used to form a string of storage transistors in a three-dimensional array. Conductive layers 11 and 15 may be omitted in other embodiments of the present invention.

In the present embodiment, the channel region is formed in a thin layer between and in contact with the drain region 12 and the source region 14. The drain region 12 and the source region 14 are separated by an isolation dielectric layer 24, also referred to as a body dielectric layer. Limiting the channel region 16 to a thin region between the source/drain regions and the gate dielectric reduces the parasitic capacitance of the storage transistor. When formed in an array, the storage transistor 10 may be isolated from adjacent storage transistors by an isolation dielectric layer 26, also referred to as an interlayer dielectric layer. For example, when the storage transistor 10 is formed as a vertical channel thin-film transistor as shown in FIG. 1, the interlayer dielectric layer 26 isolates each storage transistor from other storage transistors above or below the vertical channel thin-film transistor. A string of vertical channel thin-film transistors may share a contiguous charge storage film 20 and gate conductor 22. For example, the charge storage film 20 and the gate conductor 22 may extend above and below the storage transistor 10 to other storage transistors above and below to form a string. A storage transistor 10 is formed at the intersection of the charge storage film 20, the gate conductor 22 and the channel 16, in between the source and drain regions 14, 12.

In some embodiments, the drain region 12 and the source region 14 are formed as doped semiconductor layer, for example, a n+ polysilicon layer. The channel region 16 is formed as a doped semiconductor layer, for example, a p− polysilicon layer. The gate conductor 22 is formed as a metal layer, such as a titanium nitride (TiN)-lined tungsten (W) layer. The drain and source conductive layers 11 and 15 can each be formed as a metal layer, such as a titanium nitride (TiN)-lined tungsten (W) layer. The isolation dielectric layers 24 and 26 can be formed as silicon oxide layers in one example. In some embodiments, the body dielectric layer 24 is a silicon oxide layer and the interlayer dielectric layer 26 is a silicon oxide carbide (SiOC) layer. The charge storage film 20 is a multi-layer including a tunneling dielectric layer, a charge trapping layer, and a blocking layer, in this order between the channel region 16 and the gate conductor 22.

In storage transistor (memory cell) 10, data is stored in the charge storage film 20, and more specifically, in the charge trapping layer of the charge storage film. In one example, the charge trapping layer may be silicon nitride. In operation, a current is induced to flow from the source region 14 through the channel region 16 to the drain region 12, when a suitable high voltage-relative to the voltage at the source region 14—is placed on the gate conductor 22. As thus biased, electrons are drawn from the channel region 16 and transported through the thin tunneling dielectric layer into the charge trapping layer of the charge storage film 20. The electrons are trapped in trap sites of the charge trapping layer where the accumulation of electrons shifts the threshold voltage $V_t$ of the memory cell 10 to a higher value. In the present example, the higher value in the threshold voltage $V_t$ of the memory cell 10 represents a "programmed" state. Alternately, by placing a suitably high voltage of the opposite polarity on the gate conductor 22, electrons are removed from the charge trapping layer of the charge storage film 20. Electrons tunnel through the tunneling dielectric layer back into the channel region 16. The depletion of electrons shifts the threshold voltage $V_t$ of the memory cell 10 to a lower value. In the present example, the lower value in the threshold voltage $V_t$ of memory cell 10 represents an "erased" state.

Figure 2:
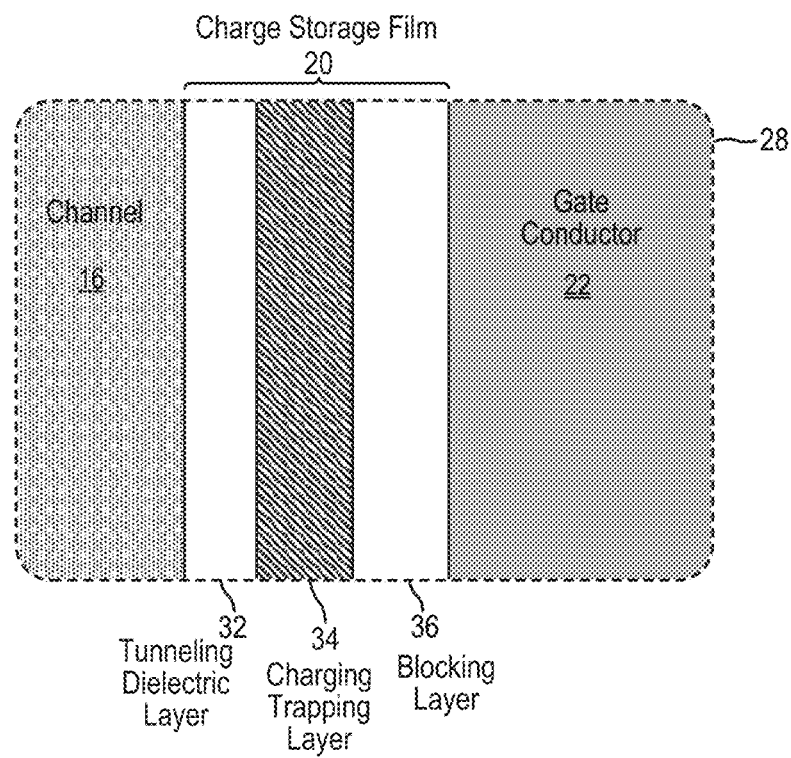
FIG. 2 illustrates a portion of the storage transistor of FIG. 1 including the charge storage film in embodiments of the present invention.

As thus constructed, the charge storage film 20 stores data by exchanging electrons with the channel region and trapping the electrons in the charge trapping layer of the charge storage film. The charge storage film is sometimes referred to as the memory stack of the storage transistor. The structure of the charge storage film 20 is illustrated in FIG. 2 in more details. FIG. 2 illustrates a portion of the storage transistor ("memory cell") of FIG. 1 including the charge storage film in embodiments of the present invention. In particular, FIG. 2 illustrate a portion 28 of the storage transistor 10 of FIG. 1. Referring to FIG. 2, the charge storage film 20 is a multi-layer including a tunneling dielectric layer 32 formed adjacent the channel 16, a charge trapping layer 34 formed adjacent the tunneling dielectric layer 32, and a blocking layer 36 formed between the charge trapping layer 34 and the gate conductor 22.

In operation, when a suitably high voltage of a first polarity is applied to the gate conductor 22 relative to the source region 14 (FIG. 1) and a current is induced to flow from the source region 14 through the channel region 16 to the drain region 12, electrons are transported from the channel region 16 through the thin tunneling dielectric layer 32 into the charge trapping layer 34. The electrons are trapped in trap sites of the charge trapping layer 34. Meanwhile, the blocking layer 36 prevents tunneling of electrons from the charge trapping layer 34 to the gate conductor 22. Alternately, when a suitably high voltage of the second, opposite polarity is applied to the gate conductor 22 relative to the source region 14, electrons are removed from the charge trapping layer 34 and tunnel through the tunneling dielectric layer 32 back into the channel region 16. The accumulation of electrons in the charge trapping layer 34 shifts the threshold voltage $V_t$ of the memory cell 10 to a higher value while the depletion of electrons from the charge trapping layer 34 shifts the threshold voltage $V_t$ of the memory cell 10 to a lower value. The shifting of the threshold voltage of the memory cell 10 realizes the memory function of the thin-film transistor. For example, two logical states can be represented by the higher and lower threshold voltages of the memory cell as a result of the charge accumulation or charge depletion.

In some examples, the charge storage film 20 is formed as a multilayer including layers of silicon oxide, silicon nitride, and silicon oxide, and is collectively referred to as an ONO layer. In another example, the charge storage film 20 is formed as a multilayer including layers of silicon oxide, silicon nitride, silicon oxide, and aluminum oxide and is collectively referred to as an ONOA layer. When the ONO or ONOA layers are used as the charge storage film 20 in the storage transistor, varying amounts of charge are trapped in the charge trapping layer 34 to cause the threshold voltage of the storage transistor to shift. The charge storage film 20, constructed as ONO layers or ONOA layers, functions as the memory stack to store the data of the memory cell.

In some embodiments, the tunneling dielectric layer 32 is ideally very thin (e.g. less than 3 nm for silicon oxide), to allow for direct tunneling of charge carriers to the charge trapping layer 34. More specifically, the thickness of the tunneling dielectric layer 32 refers to the distance between the interface of the channel layer 16 and the tunneling dielectric layer 32 and the interface of the tunneling dielectric layer 32 and the charge trapping layer 34. With very thin tunnel dielectric layers, charge can accumulate or deplete very rapidly from the charge trapping layer 34. As described above, the accumulation or depletion of charge from the charge trapping layer 34 corresponds to programming or erase of the memory cell 10. For example, electrons can accumulate in the charge trapping layer 34 until a minimum change in the threshold voltage of the memory cell occurs. Accumulation of electrons in the charge trapping layer 34 corresponds to the programmed state. These same electrons can be depleted from the charge trapping layer 34 until the threshold voltage of the memory cell again changes by some amount. Depletion of electrons in the charge trapping layer 34 corresponds to the erased state.

In some embodiments, the charge trapping layer 34 is a silicon-silicon nitride film, sometimes referred to as a silicon-rich silicon nitride film. A stoichiometric silicon nitride film has a composition of $Si_3N_4$ or, equivalently, $SiN_{1.33}$. A silicon-silicon nitride film, or a non-stoichiometric film, will have a composition $SiN_x$, where x<1.33. In embodiments of the present invention, a silicon-silicon nitride film refers to a film including silicon and silicon nitride materials. In one example, a silicon-silicon nitride film includes silicon and silicon nitride materials existing as nano-crystals, also referred to as nano-dots. The charge trapping layer 34 may also contain trace amounts of other impurities, such as chlorine, arising from contamination from either background or the source gases. Silicon-silicon nitride films have a higher density of trap sites for charge carriers than stoichiometric silicon nitride.

In some cases, silicon-silicon oxide films, sometimes referred to as silicon-rich silicon oxide films, can also be used to form the charge trapping layer 34. However, in most cases, silicon-silicon nitride films are preferred over silicon-silicon oxide films as the time-to-program and time-to-erase for a given program or erase voltage is much smaller for silicon-silicon nitride films. Or, alternatively, for a fixed program and/or erase time, the voltages required are smaller for silicon-silicon nitride films compared to silicon-silicon oxide films as the charge trapping layer. To put it in another way, the traps in a silicon-silicon nitride film have a smaller barrier to being filled and then erased as compared with the traps in a silicon-silicon oxide film.

The very thin tunnel dielectric layer in the memory cell 10 that allows for high program/erase endurance, low program voltage, and low erase voltage, can lead to two complications: (1) a low data retention time and (2) a low threshold to disturbing the programmed state during the "read" of the memory cell 10. Data retention refers to the length of time before a certain amount of the charge has leaked out of the charge trapping layer to cause an appreciable change in the threshold voltage $V_t$ of the memory cell. A low data retention time of a memory cell is caused by charge leaking from the charge trapping layer. Read disturb refers to a change in the amount of charges in the charge trapping layer, which then changes the threshold voltage $V_t$ of the memory cell, where the change is caused by reading the memory cell at a certain voltage. With a thin tunneling dielectric layer, charges can move more easily through the tunneling dielectric layer from the charge trapping layer during read of the memory cell.

In embodiments of the present invention, the tunneling dielectric layer 32 is formed using a material selected from: silicon oxide ($SiO_x$), silicon nitride ($Si_xN_y$), silicon oxide nitride (SiON), any aluminum oxide ($AlO_x$), any hafnium oxide ($HfO_x$), zirconium oxide ($ZrO_x$), any hafnium silicon oxide ($HfSi_xO_y$), any hafnium zirconium oxide (HfZrO), or any combination thereof. In one embodiment, the tunneling dielectric layer 32 is a silicon oxide nitride (SiON) layer. A silicon oxide nitride (SiON) layer refers to a material being a blend of stoichiometric or near-stoichiometric silicon oxide ($SiO_2$) and stoichiometric or near-stoichiometric silicon nitride ($Si_3N_4$). In one embodiment, the tunneling dielectric layer 32 has a thickness of less than 3 nm and in particular, has a thickness of about 1.2 nm or 12 Å.

In embodiments of the present invention, the blocking layer 36 is formed using a material selected from: silicon oxide ($SiO_x$), aluminum oxide ($Al_2O_3$), or both. That is, the blocking layer 36 may be formed as a multilayer of silicon oxide and aluminum oxide. In one embodiment, the blocking layer 36 has a thickness of about 5 nm or 50 Å.

In embodiments of the present invention, the storage transistor 10 includes a charge storage film 20 that uses a silicon-silicon oxide-silicon nitride layer as the charge trapping layer 34. As described above, the silicon-silicon oxide-silicon nitride layer is sometimes referred to as a "silicon-rich silicon oxide nitride layer." In embodiments of the present invention, a silicon-silicon oxide-silicon nitride layer is a layer including silicon (Si), silicon oxide ($SiO_2$) and silicon nitride ($Si_3N_4$) materials. In particular, the silicon-silicon oxide-silicon nitride layer is formed as a blend or a mixture of materials including silicon (Si), silicon oxide ($SiO_2$) and silicon nitride ($Si_3N_4$), where the silicon oxide and silicon nitride may or may not be their respective stoichiometric compounds. In one example, a silicon-silicon oxide-silicon nitride thin film includes silicon, silicon oxide and silicon nitride materials with some or all of the materials existing as nano-crystals or nano-dots. In embodiments of the present invention, a silicon-silicon oxide-silicon nitride layer refers to a layer including three materials: silicon, silicon oxide and silicon nitride; whereas a silicon oxide nitride (SiON) layer refers to a layer including two materials: stoichiometric or near-stoichiometric silicon oxide ($SiO_2$) and stoichiometric or near-stoichiometric silicon nitride ($Si_3N_4$).

In particular, a silicon-silicon nitride layer could be more prone to both low data retention and a low threshold to read disturb relative to a silicon-silicon oxide layer. However, replacing a small amount of silicon nitride in a silicon-silicon nitride layer with silicon oxide results in layer that has a better combination of attributes than either a silicon-silicon nitride layer or a silicon-silicon oxide layer by itself. In embodiments of the present invention, a storage transistor uses a silicon-silicon oxide-silicon nitride layer to implement the charge trapping layer to realize low program and erase voltages, improved data retention, and increased resistance to read disturb as compared to using a silicon-silicon nitride layer as the charge trapping layer.

In some embodiments, the silicon-silicon oxide-silicon nitride charge trapping layer 34 has a composition including silicon, between 5 and 30 atomic percent (at %) of oxygen, and between 25 and 50 atomic percent (at %) of nitrogen. In one example, the silicon-silicon oxide-silicon nitride charge trapping layer 34 has a composition including 44 at % of silicon, 9 at % of oxygen, and at least 42 at % of nitrogen (e.g. 45.9 at % of nitrogen), with remaining material being unintentional impurities, such as 1.1 at % of chlorine. In one embodiment, the silicon-silicon oxide-silicon nitride charge trapping layer 34 has a thickness of between 1 nm to 30 nm and in particular, has a thickness of about 5 nm or 50 Å.

In alternate embodiments, the charge trapping layer 34 is a multilayer formed by one or more silicon nitride ($Si_3N_4$) layers and a silicon-silicon oxide-silicon nitride layer. In one embodiment, the charge trapping layer 34 is a multilayer formed by stoichiometric silicon nitride ($Si_3N_4$), silicon-silicon oxide-silicon nitride, and stoichiometric silicon nitride ($Si_3N_4$) in this order. That is, the charge trapping layer 34 includes a layer of silicon-silicon oxide-silicon nitride sandwiched between silicon nitride ($Si_3N_4$) layers.

It is instructive to note that silicon-silicon nitride films will intrinsically contain a small amount of unintentional oxygen as an impurity, which can be introduced during film deposition from the background or from contamination in the carrier gases. So even with no deliberate introduction of a gas sources of oxygen, silicon-silicon nitride films will contain some native amount of oxygen impurity. However, in embodiments of the present invention, the silicon-silicon oxide-silicon nitride layer used as the charge trapping layer includes oxygen that is deliberately introduced and include oxygen content greater than the native impurity level. For instance, silicon-silicon nitride films may contain up to a native atomic percent of 3.0 at % of oxygen. In embodiments of the present invention, the silicon-silicon oxide-silicon nitride layer used as the charge trapping layer includes 5.0 at % or more of oxygen, where the oxygen is deliberately introduced, such as by an oxygen containing gas, such as nitrous oxide.

In some embodiments, the silicon-silicon oxide-silicon nitride layer is deposited by any one of suitable deposition methods including but not limited to chemical vapor deposition (CVD), low pressure chemical vapor deposition (LPCVD) and atomic layer deposition (ALD). In one example the silicon-silicon oxide-silicon nitride charge trapping layer is deposited using LPCVD, at a temperature of 740-820° C., a pressure of 200 mTorr, using gas flows of dichlorosilane (DCS, $SiH_2Cl_2$), ammonia ($NH_3$), and nitrous oxide ($N_2O$). In this case, the nitrous oxide ($N_2O$) acts as the source gas for deliberately introducing oxygen into the silicon-silicon oxide-silicon nitride layer. In one example, the DCS gas flow is about 500 sccm, the ammonia gas flow is about 50 sccm and the nitrous oxide gas flow is about 20 sccm. In another embodiment, the silicon-silicon oxide-silicon nitride charge trapping layer is deposited using ALD at a temperature of 200-680° C.

In comparison, the silicon-silicon nitride layer can be deposited by suitable deposition methods such as CVD, LPCVD or ALD. In an example of LPCVD deposition of the silicon-silicon nitride film, gas flows of dichlorosilane (DCS), ammonia, and nitrogen are used. The deposition can be carried out at a temperature of 755° C. and a pressure of 200 mTorr. The resulting silicon-silicon nitride layer may have a composition including 45.8 at % of silicon and 50.7 at % of nitrogen, with remaining material being impurities, such as 3 at % of oxygen and 1.1 at % of chlorine. The oxygen and chlorine are unintentional contaminants introduced during the deposition process.

In this example, the silicon-silicon nitride layer has an index of refraction of 2.24. The index of refraction is influence by the silicon-to-nitrogen ratio. The higher the index of refraction, the higher amount of "free" Si in the silicon-silicon nitride film. An index of refraction of about 2.24 corresponds to a composition of $SiN_{1.11}$, as compared to "stoichiometric" silicon nitride $SiN_{1.33}$ which has an index of refraction of about 2.00.

Table 1 compares the electrical characteristics that can be obtained for a storage transistor A including a silicon-silicon nitride layer as the charge trapping layer and a storage transistor B including a silicon-silicon oxide-silicon nitride layer as the charge trapping layer in some examples. In particular, the values for storage transistor B are shown relative to representative values of storage transistor A for each parameter, where the representative values are denoted as "X". For example, the Ioff value of storage transistor B is 64% less than the value of storage transistor A. That is, the Ioff value of storage transistor B is 0.36 times the representative value X of storage transistor A.

TABLE 1

|  | Storage Transistor A Silicon-Silicon Nitride Charge Trapping Layer | Storage Transistor B Silicon-Silicon Oxide-Silicon Nitride Charge Trapping Layer |
| --- | --- | --- |
| Vprog | X V | 1.23X V |
| Verase | −X V | −1.24X V |
| Data retention | X V | 0.36X V |
| Read disturb | X ms | 90X ms |
| Ion | X pA | 2.24X pA |
| Ioff | X pA | 0.36X pA |

As described herein, the charge storage film 20 can be used to form the gate dielectric of thin-film storage transistors in a three-dimensional (3D) NOR memory array where the storage transistors are operated to perform program, erase, and read functions. Storage transistor A, using a silicon-silicon nitride layer as the charge trapping layer, has a lower programming voltage (Vprog) and lower erase voltage (Verase) as compared to storage transistor B which uses a silicon-silicon oxide-silicon nitride layer as the charge trapping layer. In the present example, the programming voltage Vprog refers to the voltage needed to effect a 1.0V change in the threshold voltage of the storage transistor in 400 ns and the erase voltage Verase refers to the voltage needed to effect a 1.0 V change in the threshold voltage of the storage transistor in 400 ns. The introduction of silicon oxide into the charge trapping layer makes it more difficult to program or erase the storage transistor B. However, other characteristics of the storage transistor B improves significantly over the characteristics of storage transistor A. For example, the data retention characteristic measures the change in threshold voltage in 10 minutes at room temperature. Storage transistor B has a lower voltage than storage transistor A, meaning that storage transistor B has better data retention than storage transistor A. The read disturb characteristic measures the time to effect a 0.1V change in the threshold voltage at 2.0V Read voltage. Storage transistor B has a read disturb time of 90× times that of storage transistor A, a significant improvement.

One important characteristic of the storage transistor in the 3D NOR memory is the current passing through the transistor, also called the drain current, when no bias voltage is applied to the gate conductor, i.e. the "OFF" state current or Ioff. This is referred to as the leakage current. It is desirable to have as low a leakage current value as possible, as leakage current consumes power without providing any memory function benefit. Another important characteristic of the storage transistor is the current passing through the transistor when a bias voltage is applied to the gate conductor, i.e. the "ON" state current or Ion. It is desirable that the ON state current be as high as possible. Higher values for the ON state current make it easier to distinguish between a programmed memory cell and an erased memory cell.

In the example shown in Table 1, storage transistor B has a ON state current 2.24× that of storage transistor A. The ON state current is measured as the drain current of the storage transistor with gate voltage at 4.0 V and the drain biased at 0.5 V. Furthermore, storage transistor B has a much lower Off state or leakage current as compared to storage transistor A, which is measured as the drain current of the storage transistor with gate voltage at 0.0 V and the drain biased at 0.5 V.

The gate dielectric of a thin-film storage transistor can affect the ON and OFF current in several ways. For example, the gate dielectric may impart mechanical stress on the channel which may increase the mobility of charge carriers, which is known as strain engineering. The value of the mobility of charges moving through the channel is one contributing characteristic to the ON current, with higher mobilities resulting in higher ON currents. The silicon-silicon oxide-silicon nitride charge trapping layer provide a higher ON current and smaller OFF current than the silicon-silicon nitride charge trapping layer. This effect is attributed to the silicon-silicon oxide-silicon nitride layer imparting a more advantageous stress to the channel compared with the silicon-silicon nitride film.

Figure 3:
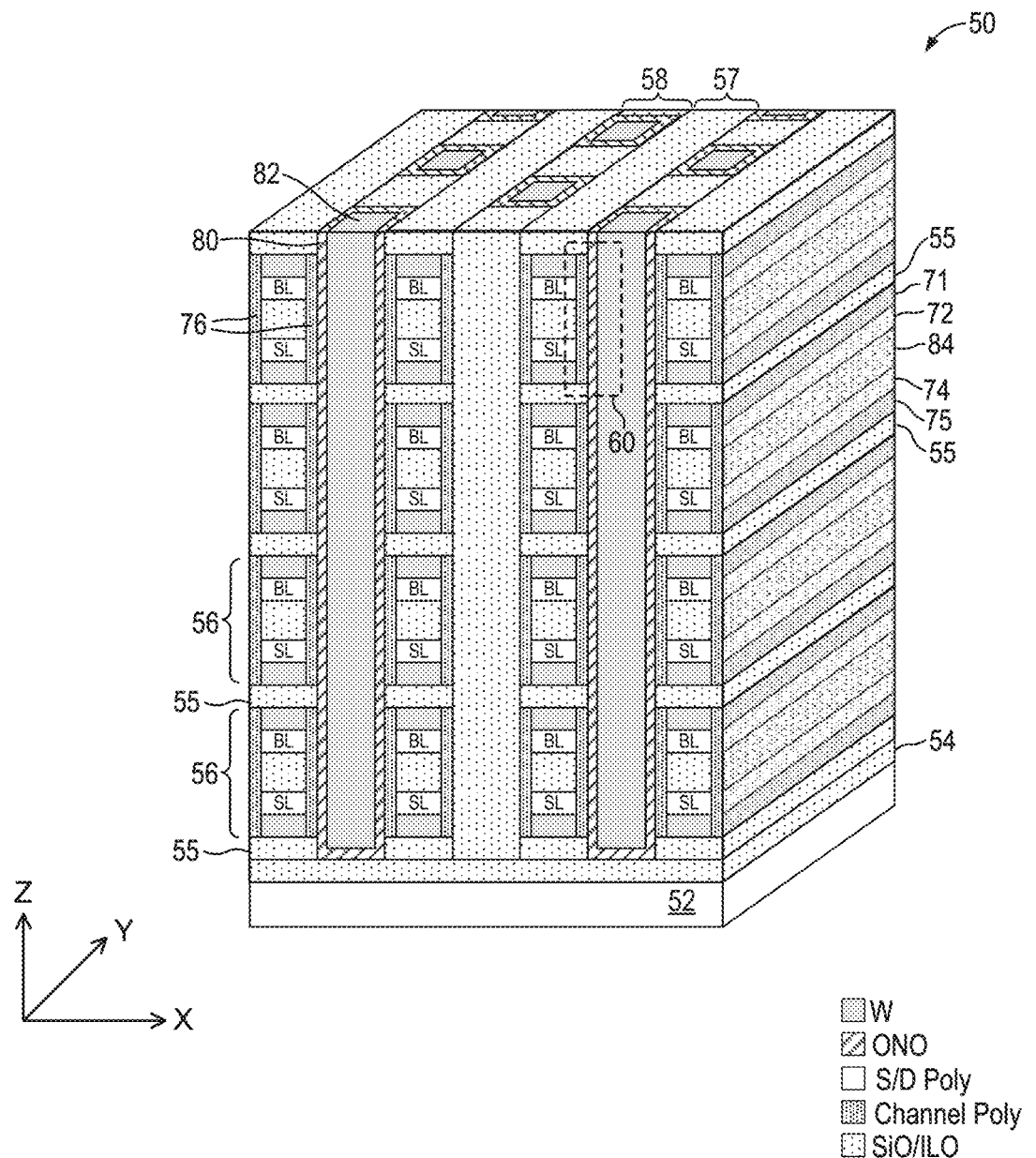
FIG. 3 illustrates an exemplary memory structure including a three-dimensional array of NOR memory string in some examples.

FIG. 3 illustrates an exemplary memory structure including a three-dimensional array of NOR memory string in some examples. The '553 patent describes various methods for forming the 3D NOR memory string in some examples. Referring to FIG. 3, a memory structure 50 includes thin-film storage transistors 60 formed as NOR memory strings along a horizontal direction (the Y-direction) in multiple planes, each plane being formed by a set of active layers 56. In particular, the memory structure 50 includes a number of active layers 56 formed on a planar surface of a semiconductor substrate 52. A buffer oxide layer 54 may be provided between the semiconductor substrate 52 and the active layers 56 formed on the substrate. The active layers 56 are formed one on top of another in the Z-direction (i.e., along a direction normal to the planar surface of the substrate 52) and separated from each other by an isolation dielectric layer 55, such as a silicon oxide carbide (SiOC) layer. The active layers 56 are divided in the X-direction into narrow strips ("active strips") 57 that are stacked one on top of another to form stacks of active strips ("active stacks") extending in the Y-direction.

Each active layer 56 includes first and second doped semiconductor layers 72, 74 (e.g., $n^+$ polysilicon or heavily doped n-type polysilicon) separated by a dielectric layer 84 (e.g., silicon oxide). The first and second doped semiconductor layers 72, 74 form the drain and source regions of the storage transistor 60. Each active layer 56 may include one or more conductive layers 71, 75 (e.g., titanium nitride (TiN)-lined tungsten (W)). Each conductive layer 71 or 75 is formed adjacent one of the doped semiconductor layers 72, 74 to reduce the resistivity of the doped semiconductor layer it contacts. During intermediate processing steps, the active layer may include sacrificial layers (e.g., silicon nitride) to be subsequently replaced by final conductive layers. Subsequent processing steps form the channel regions 76 (e.g., $p^-$ polysilicon or lightly doped p-type polysilicon), the charge storage films 80, and the gate conductors or gate electrodes 82 (e.g., TiN-lined W) in narrow trenches between the separated active stacks. The gate electrodes 82 and the charge storage films 80 are formed as columnar structures extending in the Z-direction. In the present example, the charge storage film 80 encircles the gate electrode 82 in the columnar structure. In the present description, the gate electrodes 82 are also referred to as "local word lines" and a gate electrode 82 encircled by a charge storage film 80 is collectively referred to as a local word line (LWL) structure 58.

The first and second doped semiconductor layers of each active strip form a source region 74 ("common source line") and a drain region 72 ("common bit line") of the storage transistors which may be formed along one or both sides of the active strip 57. In particular, the storage transistor 60 is formed at the intersection of an active strip 57 with the channel region 76 and an LWL structure 58. In the present illustration, the LWL structures 58 are formed staggered in adjacent trenches bordering an active strip 57 so that storage transistors formed on both sides of an active strip are offset from each other in the Y-direction along the memory string.

As thus constructed, the storage transistor 60 is formed by the first doped semiconductor layer 72 forming the drain region (the common bit line), the second doped semiconductor layer 74 forming the source region (the common source line), the channel region 76 in contact with both the drain region 72 and the source region 74, the gate electrode 82 and the portion of the charge storage film 80 that is situated between the gate electrode 82 and the channel region 76. Each storage transistor 60 is isolated from adjacent storage transistors along an active stack (in the Z-direction) by the isolation dielectric layer 55. As thus configured, along each active strip (in the Y-direction), the storage transistors that share the common source line and the common bit line form a NOR memory string (referred herein as a "Horizontal NOR memory string" or "HNOR memory string").

To complete the memory circuit, various types of circuits are formed in or at the surface of the semiconductor substrate 52 to support the operations of the HNOR memory strings. Such circuits are referred to as "circuits under array" ("CUAs") and may include various voltage sources for power supply, ground, programming, erase or read voltages, sense amplifiers, various latches and registers, various logic circuits, and various analog circuits.

Embodiments of the present invention describe the use of a silicon-silicon oxide-silicon nitride film to form the charge trapping layer of the charge storage film 80. The silicon-silicon oxide-silicon nitride charge trapping layer incorporated in a thin-film storage transistor realizes improved data retention and read disturb characteristics as well as increasing the ON state current while reducing the OFF state leakage current.

In this detailed description, process steps described for one embodiment may be used in a different embodiment, even if the process steps are not expressly described in the different embodiment. When reference is made herein to a method including two or more defined steps, the defined steps can be carried out in any order or simultaneously, except where the context dictates or specific instruction otherwise are provided herein. Further, unless the context dictates or express instructions otherwise are provided, the method can also include one or more other steps carried out before any of the defined steps, between two of the defined steps, or after all the defined steps In this detailed description, various embodiments or examples of the present invention may be implemented in numerous ways, including as a process; an apparatus; a system; and a composition of matter. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. A thin-film storage transistor, comprising a source region, a drain region, a channel region, a gate conductor, and a charge storage film provided between the channel region and the gate conductor and electrically isolated therefrom, the charge storage film comprising:
   a tunneling dielectric layer formed adjacent the channel region; and
   a charge trapping layer formed adjacent the tunneling dielectric layer, the charge trapping layer comprising a silicon-rich silicon oxide nitride layer including silicon, silicon oxide and silicon nitride materials,
   wherein the charge trapping layer has a composition including 44 atomic percent of silicon, at least 9 atomic percent of oxygen, and at least 42 atomic percent of nitrogen.

2. The thin-film storage transistor of claim 1, wherein the charge trapping layer comprises a layer comprising a mixture of silicon, stoichiometric silicon oxide and stoichiometric silicon nitride materials.

3. The thin-film storage transistor of claim 1, wherein the charge trapping layer comprises a layer comprising a mixture of silicon, silicon oxide and silicon nitride materials, where the silicon oxide and the silicon nitride materials are non-stoichiometric compounds.

4. The thin-film storage transistor of claim 1, wherein the layer of silicon, silicon oxide and silicon nitride materials is a silicon-silicon oxide-silicon nitride layer and the charge trapping layer comprises a multilayer comprising at least a silicon nitride layer and a silicon-silicon oxide-silicon nitride layer.

5. The thin-film storage transistor of claim 4, wherein the silicon nitride layer of the charge trapping layer comprises a stoichiometric silicon nitride layer.

6. The thin-film storage transistor of claim 4, wherein the multilayer of the charge trapping layer comprises the silicon-silicon oxide-silicon nitride layer sandwiched between silicon nitride layers.

7. The thin-film storage transistor of claim 1, wherein the charge trapping layer comprises a layer comprising an atomic percent of oxygen greater than an atomic percent of oxygen indicative of a native impurity level of oxygen present in a silicon nitride film or a silicon-silicon nitride film.

8. The thin-film storage transistor of claim 1, wherein the tunneling dielectric layer has a thickness of less than 3 nm and the charge trapping layer has a thickness of 1 to 30 nm.

9. The thin-film storage transistor of claim 1, wherein the tunneling dielectric layer of the charge storage film comprises a material selected from silicon oxide ($SiO_x$), silicon nitride ($Si_xN_y$), silicon oxide nitride (SiON), any aluminum oxide ($AlO_x$), any hafnium oxide ($HfO_x$), zirconium oxide ($ZrO_x$), any hafnium silicon oxide ($HfSi_xO_y$), any hafnium zirconium oxide (HfZrO), or any combination thereof.

10. The thin-film storage transistor of claim 1, wherein the charge storage film further comprises a blocking layer formed between the charge trapping layer and the gate conductor.

11. The thin-film storage transistor of claim 10, wherein the blocking layer of the charge storage film comprises a material selected from silicon oxide ($SiO_x$) and aluminum oxide ($Al_2O_3$).

12. The thin-film storage transistor of claim 10, wherein the blocking layer of the charge storage film comprises a multilayer comprising silicon oxide ($SiO_x$) and aluminum oxide ($Al_2O_3$).

13. The thin-film storage transistor of claim 10, wherein the tunneling dielectric layer has a thickness of about 1.2 nm, the charge trapping layer has a thickness of 5 nm and the blocking layer has a thickness of 5 nm.

14. The thin-film storage transistor of claim 10, wherein the charge storage film comprises a silicon oxide nitride layer as the tunneling dielectric layer and a silicon oxide layer as the blocking layer.

15. The thin-film storage transistor of claim 1, wherein the thin-film storage transistor is provided in a NOR memory string.

16. The thin-film storage transistor of claim 15, wherein the NOR memory string is one of a plurality of NOR memory strings arranged in a memory structure formed above a semiconductor substrate.

* * * * *